United States Patent
Chidlovskii

(10) Patent No.: US 7,890,438 B2
(45) Date of Patent: Feb. 15, 2011

(54) STACKED GENERALIZATION LEARNING FOR DOCUMENT ANNOTATION

(75) Inventor: Boris Chidlovskii, Meylan (FR)

(73) Assignee: Xerox Corporation, Norwalk, CT (US)

( * ) Notice: Subject to any disclaimer, the term of this patent is extended or adjusted under 35 U.S.C. 154(b) by 575 days.

(21) Appl. No.: 11/954,484

(22) Filed: Dec. 12, 2007

(65) Prior Publication Data

US 2009/0157572 A1    Jun. 18, 2009

(51) Int. Cl.
*G06F 15/18* (2006.01)
*G06N 7/00* (2006.01)

(52) U.S. Cl. .......................... 706/12; 706/20
(58) Field of Classification Search .............. 706/12
See application file for complete search history.

(56) References Cited

U.S. PATENT DOCUMENTS

| | | | |
|---|---|---|---|
| 7,165,216 B2 * | 1/2007 | Chidlovskii et al. | 715/237 |
| 7,730,396 B2 * | 6/2010 | Chidlovskii et al. | 715/239 |
| 7,756,800 B2 * | 7/2010 | Chidlovskii | 706/20 |
| 2004/0111253 A1 | 6/2004 | Luo et al. | |
| 2004/0205482 A1 | 10/2004 | Basu et al. | |
| 2006/0101058 A1 | 5/2006 | Chidlovskii | |
| 2006/0112190 A1 | 5/2006 | Hulten et al. | |
| 2006/0212142 A1 | 9/2006 | Madani et al. | |

OTHER PUBLICATIONS

Automating the dispute resolution in a task dependency network, Letia, I.A.; Groza, A.; Intelligent Agent Technology, IEEE/WIC/ACM International Conference on Digital Object Identifier: 10.1109/IAT.2005.47 Publication Year: 2005 , pp. 365-371.*

Power quality detection with classification enhancible wavelet-probabilistic network in a power system, Lin, C.-H.; Tsao, M.-C.; Generation, Transmission and Distribution, IEE Proceedings-vol. 152 , Issue: 6 Digital Object Identifier: 10.1049/ip-gtd:20045177 Publication Year: 2005 , pp. 969-976.*

Learning acyclic decision trees with Functional Dependency Network and MDL Genetic Programming, Wing-Ho Shum; Kwong-Sak Leung; Man-Leung Wong; Computing in the Global Information Technology, 2006. ICCGI '06. International Multi-Conference on Digital Object Identifier: 10.1109/ICCGI.2006.46 Publication Year: 2006 , pp. 25-25.*

(Continued)

*Primary Examiner*—Michael Holmes
(74) *Attorney, Agent, or Firm*—Fay Sharpe LLP

(57) ABSTRACT

A document annotation method includes modeling data elements of an input document and dependencies between the data elements as a dependency network. Static features of at least some of the data elements are defined, each expressing a relationship between a characteristic of the data element and its label. Dynamic features are defined which define links between an element and labels of the element and of a second element. Parameters of a collective probabilistic model for the document are learned, each expressing a conditional probability that a first data element should be labeled with information derived from a label of a neighbor data element linked to the first data element by a dynamic feature. The learning includes decomposing a globally trained model into a set of local learning models. The local learning models each employ static features to generate estimations of the neighbor element labels for at least one of the data elements.

25 Claims, 10 Drawing Sheets

OTHER PUBLICATIONS

Adaptive multiple fault detection and alarm processing for loop system with probabilistic network, Whei-Min Lin; Chia-Hung Lin; Zheng-Chi Sun; Power Delivery, IEEE Transactions on vol. 19 , Issue: 1 Digital Object Identifier: 10.1109/TPWRD.2003.820203 Publication Year: 2004 , pp. 64-69.*

A.L.Berger, S.D.Pietra, V.J.D.Pietra, A Maximum Entropy Approach to Natural Language Processing, *Computational Linguistics*, 22(1):39-71, 1996.

Y.Altun, D.McAllester, M.Belkin, Maximum Margin Semi-Supervised Learning for Structured Variables, *Proc. NIPS*, 2005.

B.Chidlovskii, J.Fuselier, L.Lecerf, ALDAI: Active Learning Documents Annotation Interface, *Proc. ACM Symposium on Document Engineering*, 2006.

B.Chidlovskii, L.Lecerf, Stacked Dependency Networks for Layout Document Structuring, *SIGIR Information Retrieval and Graphical Model Workshop*, Amsterdam, The Netherlands, Jul. 2007 (Abstract).

U.Brefeld, T.Scheffer, Semi-Supervised Learning for Structured Output Variables, *Proc. ICML*, pp. 145-152, 2006.

D.H.Wolpert, Stacked Generalization, *Neural Networks*, 5(2):241-259, 1992.

U.S. Appl. No. 10/986,490, filed Nov. 10, 2004, Chidlovskii.
U.S. Appl. No. 11/032,814, filed Jan. 10, 2005, Dejean, et al.
U.S. Appl. No. 11/032,817, filed Jan. 10, 2005, Dejean, et al.
U.S. Appl. No. 11/116,100, filed Apr. 27, 2005, Dejean, et al.
U.S. Appl. No. 11/137,566, filed May 26, 2005, Meunier.
U.S. Appl. No. 11/156,776, filed Jun. 20, 2005, Chidlovskii, et al.
U.S. Appl. No. 11/170,542, filed Jun. 29, 2005, Chidlovskii, et al.
U.S. Appl. No. 11/222,881, filed Sep. 9, 2005, Bergholz.

D.H.Wolpert, W.G.Macready, Combining Stacking with bagging to Improve a Learning Algorithm, *Santa Fe Institute Technical Report 96-03-123* 1996.

G.Qu, S.Hariri, M.Yousif, A New Dependency and Correlation Analysis for Features, *Proc. ACM KDD*, 2005.

J.Lafferty, A.McCallum, F.Pereira, Conditional Random Fields: Probabilistic Models for Segmenting and Labeling Sequence Data, *ICML '01: Proc. 18th Int'l Conf. on Machine Learning*, New York, ACM Press, 2001.

J.Neville, D.Jensen, Collective Classification with Relational Dependency Networks, *Proc. ACM KDD*, 2003.

J.Neville, D.Jensen, Dependency Networks for Relational Data, *Proc. IEEE Data Mining*, 2004.

J.P.Chanod, B.Chidlovskii, H.Dejean, O.Fambon, J.Fuselier, T.Jacquin, J.L.Meunier, From Legacy Documents to XML: A Conversion Framework, *Proc. European Conf. Digital Libraries*, pp. 92-103, 2005.

J.Ruppenhofer, M.Ellsworth, M.R.L.Petruck, C.R.Johnson, J.Scheffczyk, FrameNet II: Extended Theory and Practice, Jun. 6, 2006, http://framenet.icsi.berkeley.edu/book/book.html.

L.Lecerf, B.Chidlovskii, Document Annotation by Active Learning Techniques, *Proc. ACM Symposium on Document Engineering*, 2006.

L.R.Rabiner, A Tutorial on Hidden Markov Models and Selected Applications in Speech Recognition, *Proc. IEEE*, 77(2):257-286, 1989.

M.I.Jordan, Z.Ghahramani, T.S.Jaakkola, L.K.Saul, An Introduction to Variational Methods for Graphical Models, *Machine Learning*, 37(2):183-233, 1999.

P.Melville, R.J.Mooney, Diverse Ensembles for Active Learning, *ICML '04: Proc. 21st Int'l Conf. on Machine Learning*, New York, pp. 74, ACM Press, 2004.

D.Roth, K.Small, Margin-Based Active Learning for Structured Output Spaces, *Proc. ECML*, 2006.

W.W.Cohen, V.R.Carvalho, Stacked Sequential Learning, *Proc. of the IJCAI*, 2005.

http://crfpp.sourceforge.net/. Oct. 15, 2007.
http://chasen.org/~taku/software/. Oct. 24, 2007.
http://www.vikef.net/. Oct. 15, 2007.

Bishop, et al. *Pattern Recognition and Machine learning (Information Science and Statistics)*, Oct. 2007 (Abstract only).

Kou, et al. "Stacked Graphical Models for Efficient Inference in Markov Random Fields," in Proceedings of the 2007 SIAM International Conference on Data Mining, Apr. 2007.

Heckerman, et al. "Dependency Networks for Inference, Collaborative Filtering, and Data Visualization," in *Journal of Machine Learning Research*, 1: 49-75, 2000.

Neville, et al. "Relational Dependency Networks," *Journal of Machine Learning Research* 8: 653-692, 2007.

Feng, et al. "Exploring the Use of Conditional Random Field Models and HMMs for Historical Handwritten Document Recognition," Proceedings of the Second International Conference on Document Image Analysis for Libraries, 2006.

Jensen, et al. "Blocking Gibbs Sampling in Very Large Probabilistic Expert Systems," International Journal of Human Computer Studies: Special Issue on Real-World Applications of Uncertain Reasoning, Oct. 1993.

Kopec, et al. "Document Image Decoding Using Markov Source Models," IEEE Trans. Pattern Anal. Mach.Intell., 16 (1994),6, 602-617.

Liang, et al. "Efficient Geometric Algorithms for Parsing in Two Dimensions," Int. Conference on Documents Analysis and Recognition, 2005.

Mao, et al. "Document Structure Analysis Algorithms: A Literature Survey," Proc. SPIE Electronic Imaging, vol. 5010, 197-203, 2003.

Shetty, et al. "Segmentation and Labeling of Documents using Conditional Random Fields," Proc. Document Recognition and Retrieval IV, Proceedings of SPIE, pp. 6500U-1-11, Feb. 2007.

* cited by examiner

STACKED GENERALIZATION LEARNING FOR DOCUMENT ANNOTATION

BACKGROUND

The exemplary embodiment relates to the annotation of semi-structured documents, such as HTML or layout-oriented documents. It finds application in a variety of applications, including natural language processing, legacy document conversion, Web page classification, and other automated and semi-automated document annotation applications.

In many document processing applications, it is desirable to annotate data elements of documents, such as pages, paragraphs, lines, etc., with information which describes the structure of the document as well as semantic information about the elements, such as whether a particular element relates to a document title, a reference, the name of the author, or the like. Documents created originally for human use often have little or no semantic annotation.

Automated techniques for semantic annotation of unstructured and semi-structured documents require classification methods that take into account different elements of the documents, their characteristics, and relationships between them. The majority of classifiers use "static features." A static feature captures a relationship between the element's label (e.g., as a reference, metadata, or the like) and some characteristic(s) of the element, such as its x-y positions on the page, the font size, or the textual information, such as the presence of certain words in the text. Unlike static features, so called "dynamic features" capture relationships between the labels of different elements, for example, between those of neighboring elements or widely spaced elements. Documents are often full of meaningful dynamic features. For example, labeling a line as a bibliographic reference would become more certain if the previous and next lines have already been annotated as references. It would therefore be desirable to be able to integrate such dynamic features into a classifier in order to train more accurate models for document annotation.

Dynamic features appear naturally in probabilistic graphical models and describe joint probability distributions in Bayesian networks and Markov random fields, as well as their relational extensions. See, for example, Christopher M. Bishop, "Pattern Recognition and Machine Learning" (Springer 2006) (hereinafter, "Bishop 2006") and Melville, et al., "Diverse Ensembles for Active Learning," in ICML '04: Proc. 21st Int'l. Conf on Machine Learning, New York, p. 74, (ACM Press 2004). If the dependency graph induced by the dynamic features is a chain or a tree, hidden Markov models (HMMs) or conditional random field (CRF) techniques can be used to find an optimal joint assignment of labels to elements according to optimization a certain log-likelihood function. See, for example, Lawrence R. Rabiner, "A Tutorial on Hidden Markov Models and Selected Applications in Speech Recognition," *Proc. IEEE,* 77(2):257-286 (1989); and J. Lafferty, et al., "Conditional Random Fields: Probabilistic Models for Segmenting and Labeling Sequence Data," in *ICML '01*: Proc. 18th Int'l. Conf on Machine Learning (ACM Press 2001).

If the structure of documents and/or the relationships between elements result in more complex graphs, finding exact solutions can become intractable because of the eventual enumeration of all possible annotations on the element graph. To cut down the complexity, several approximation techniques have been proposed, in particular the Gibbs sampling method. See Jordan, et al., "An Introduction to Variational Methods for Graphical Models. *Machine Learning,* 37(2): 183-233 (1999) (hereinafter Jordan 1999); and J. Neville and D. Jensen, "Collective Classification with Relational Dependency Networks," in *Proc. ACM KDD* (2003). These methods create dependency networks (DN) that approximate the joint probability as a set of conditional distributions and thus avoid the exact evaluation of the joint probability in graphical models. However, despite a guaranteed convergence to exact solutions, these methods tend to be slow, in particular for large document collections.

There remains a need for a system and method for annotating semi-structured documents based on graphical models inferred from dynamic features.

INCORPORATION BY REFERENCE

The following reference, the disclosure of which is incorporated herein by reference in its entirety, is mentioned:

U.S. Pub. No. 20060101058, entitled "SYSTEM AND METHOD FOR TRANSFORMING LEGACY DOCUMENTS INTO XML DOCUMENTS," by Boris Chidlovskii, discloses a method for converting a legacy document into an XML document. The legacy document is decomposed into a plurality of document portions. A target XML schema including a plurality of schema components is provided. Local schema are generated from the target XML schema, wherein each local schema includes at least one of the schema components in the target XML schema. A plurality of conversion tasks is generated by associating a local schema and an applicable document portion, wherein each conversion task associates data from the applicable document portion with the applicable schema component in the local schema. For each conversion task, a conversion method is selected and the conversion method is performed on the applicable document portion and local schema. Finally, a high level description language is proposed to decompose the documents in portions, assigning the portions to individual conversion tasks, validating the results of conversions and assembling them into a target XML document.

BRIEF DESCRIPTION

In accordance with one aspect of the exemplary embodiment, a method for annotating a document includes, for a plurality of different types of data element, modeling data elements of an input document and dependencies between the data elements as a dependency network, at least some of the data elements being associated with a label. The method further includes defining static features of at least some of the data elements, the static features each expressing a relationship between a characteristic of the data element and its label. A set of dynamic features is defined, each of the dynamic features defining a link between a label of a first data element in a pair of the data elements and a label of a second data element in the pair of data elements. Parameters of a collective probabilistic model for the document are learned, the parameters expressing, for each of a plurality of the data elements, a conditional probability that the data element should be labeled with a neighbor label comprising information derived from a label of another data element linked to the data element by a dynamic feature. The learning includes training a set of local learning models to generate estimations of the neighbor labels for at least one of the data elements based on static features and stacking the local learning models with higher level models to refine the estimations. Data elements in the collective probabilistic model are collectively classified based on the learned parameters, whereby at least some of the data elements are each annotated with a label comprising information derived from the label of another element.

In accordance with another aspect, a system for collectively classifying data elements of a document includes a processor which, for a plurality of different types of data element, models data elements of an input document and relational dependencies between the data elements as a relational dependency network and labels data elements in the model with labels representing static features associated with the input document. A probabilistic classifier assigns conditional probabilities that data elements are to be labeled with a dynamic feature derived from a label of another data element. The classifier employing a stacked approximation to learn parameters of the data elements, each of the parameters expressing a conditional probability that a data element should be labeled with a label derived from a label of another data element linked to the data element by a dynamic feature.

In another aspect, a method for learning functions which are to be used in annotating a document includes for a plurality of data elements in a training set of input data, the plurality of data elements being associated with a set of static features, each of the data elements being assigned to one of a plurality of data element types. The method includes deriving a dependency network in which pairs of the data elements in the training set are linked by dynamic features selected from a set of dynamic features, each of the dynamic features defining a link between a label of a first data element in a pair of the data elements and a label of a second data element in the pair of data elements. A learning algorithm is employed to return at least one function for each of a plurality of levels, each function expressing a conditional dependency of the labeling of a data element with information from a neighbor data element upon static features of the element, wherein at each level after the first level, links between more distant data elements are considered in returning the functions.

In another aspect, a document annotation method includes training a static model level respective to static features of document elements, the trained static model level configured to assign labels to document elements. A stack of model levels is assembled having the static model level as the lowest level and further having one or more higher dynamic model levels generated by one or more iterations of a stacked generalization method comprising (i) constructing a set of dynamic features that link elements of a lower level of the stack and (ii) training a dynamic model level respective to the constructed set of dynamic features, the trained dynamic model level configured to assign labels to the document elements. The stack of model levels is iteratively applied to a document starting with the lowest static model level to infer a collective probabilistic model for the document expressing a joint conditional probability of labeling data elements with labels, each label being derived from a label of a neighbor data element linked to the data element by a dynamic feature in a relational dependency network. The document is annotated based on the collective probabilistic model.

DETAILED DESCRIPTION

Aspects of the exemplary embodiment relate to a system and method for modeling the annotation of data elements of an input document in which labels for a set of data elements within the document are collectively extended with confidence estimates for labels of other data elements of the document's data elements. The document can be semantically annotated, based on the confidence estimates.

As used herein, a semi-structured document can be considered to be a data set in which information is associated with data elements in the document. The information may be in the form of labels, such as tags, metadata, a document index, or the like. An exemplary semi-structured document is in XML (eXtensible Markup Language) format, in which tags are embedded in the data content of the document. When the XML document is subsequently transmitted between computer systems, the tags are used to parse and interpret the document data by the receiving system. Each data element of a semi-structured document may have a set of characteristics, such as the font type, font size, presence of specific words in the text, etc. The data elements of the input document may have labels which together provide a basic schema (e.g., a tree structure) for the document in which child nodes may be connected to higher level (parent) nodes and ultimately to a single root node. By processing the document with a classifier trained to assign conditional probabilities for a set of neighbor element labels, to data elements linked by dynamic features, the document can be annotated with a richer set of semantic annotations.

As used herein, a dynamic feature captures a relationship between a first data element, its label, and a label of a second data element. The exemplary classification process provides a confidence estimation or probability that the first data element should be labeled with a neighbor label, the neighbor label being derived from the label of the second data element. While static (local) features remain fixed (i.e., do not change during the classification process), the probability assigned to a dynamic feature label is progressively refined. Dynamic features are defined over pairs of nodes existing in the input document structure.

The exemplary system and method are suited to a variety of document annotation problems. One example is the metadata extraction from electronic and scanned documents, where documents employ different page and markup templates, like scientific papers, technical manuals, business cards, etc. Another example is the annotation of HTML (Web pages) with semantic tags.

Figure 1:
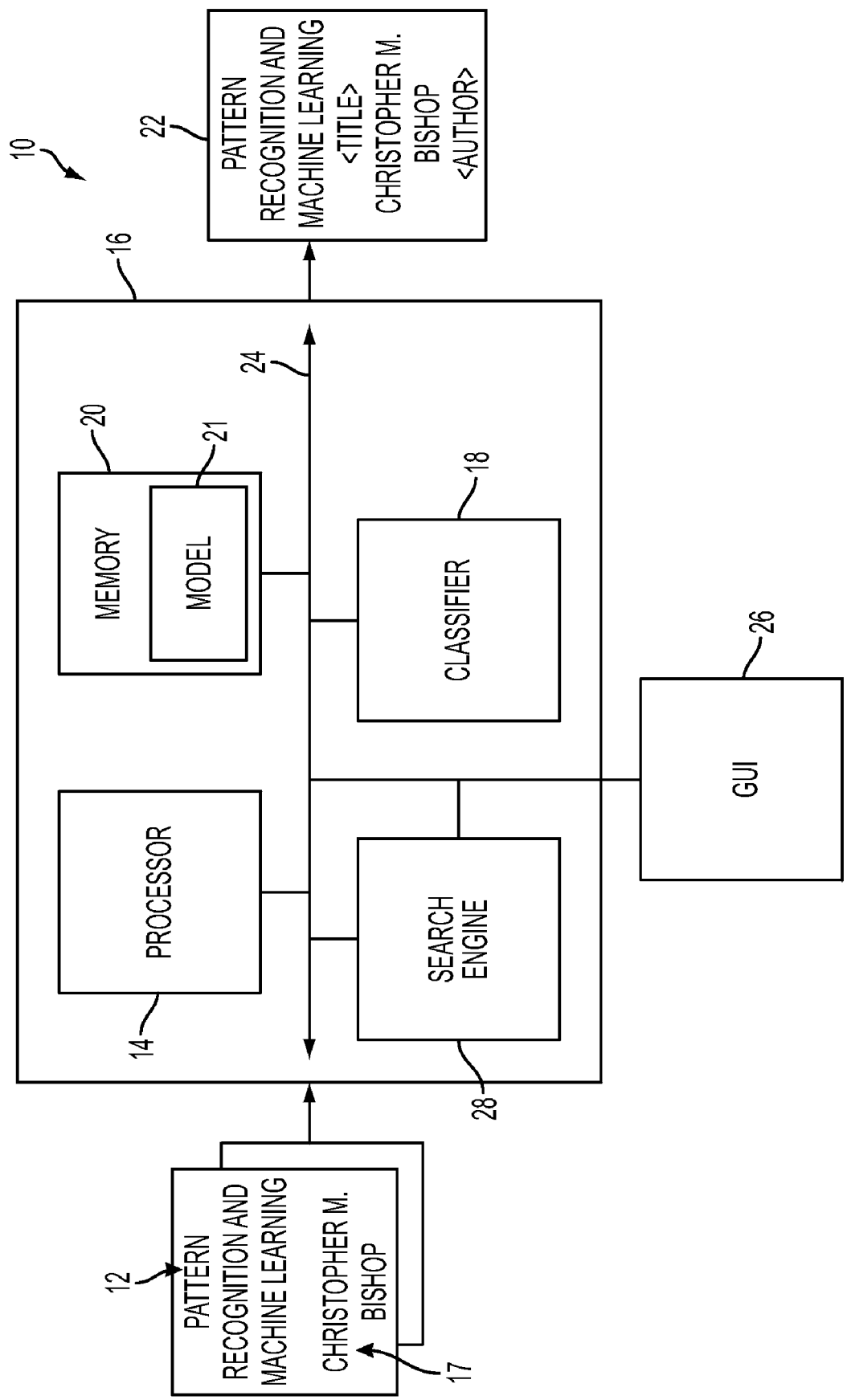
FIG. 1 is a functional block diagram of an environment in which an exemplary system for document annotation operates, in accordance with one aspect of the exemplary embodiment.

With reference to FIG. 1, an environment in which an exemplary system 10 for annotation of a semi-structured document 12 operates includes a processor 14, which may be hosted by a computing device 16, such as a general purpose computer or a dedicated computing device. The processor takes as input the semi-structured document 12 and models the collective classification of data elements 17 in the document using a classifier 18 which has been trained on a training set of annotated documents. The processor 14 executes instructions which may be stored in associated memory 20. Memory 20 may also store the input document, and a model 21 of the document in which labels of the data elements are progressively refined. The output of the system 10 may be an annotated document 22 in which at least some of the data elements have been labeled with neighbor labels comprising information derived from the labels of other data elements, based on confidence estimates provided by the model 21. Components 14, 18, 20 of the system 10 may communicate via a data/control bus 24.

Optionally, a user may access the annotated document 22 via a user interface 26 for evaluating the annotations for accuracy, completeness, and the like. The user may also employ the user interface 26 for defining dynamic features to capture domain-specific knowledge in the documents. In one embodiment, the user may employ the user interface 26 for inputting a query. The user interface accesses a search engine 28 which formulates the query for retrieving information from the annotated document 22. For example, the user may input a search for references in the document and retrieve data elements, such as lines of text, which have been annotated as being references, either in the original input document or through the collective annotation of data elements with neighbor labels.

The processor 14 and classifier 18 can be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like, such as incorporated into a workstation of a computer network or other computer device such as a personal computer or mobile computer device, such as a PDA, a cell phone, a Tablet PC, a Pocket PC, or other suitable electronic device. The processor 14 and classifier 18 may be in the form of software, hardware, or a combination of both. In one embodiment, the processor is in the form of an add-on software component for a legacy document conversion system, such as the system described in U.S. Pub. No. 20060101058 incorporated herein by reference.

The memory(s) 20 may represent any type of computer readable medium such as random access memory (RAM), read only memory (ROM), magnetic disk or tape, optical disk, flash memory, or holographic memory. In one embodiment, the memory 20 comprises a combination of random access memory and read only memory. While in the illustrated embodiment, memory 20 and processor 14 are illustrated as being hosted by the same computing device, it is to be appreciated that these components may be remote from one another and communicate via any suitable wired or wireless link, such as a computer cable, telephone line, WLAN, or WAN.

The illustrated user interface 26 may be a graphical user interface (GUI) and may include a display, such as a screen, and a user input device, such as a touch screen, keyboard, keypad, cursor control device, such as a mouse, track ball, pen, touch pad, stylus, or combination thereof. The user interface may interact with the system 10, for example, via a web browser displayed on the GUI's display.

The processor 14 and classifier 18 may be best understood with reference to the exemplary method described below, and thus will not be described in detail here.

Figure 2:
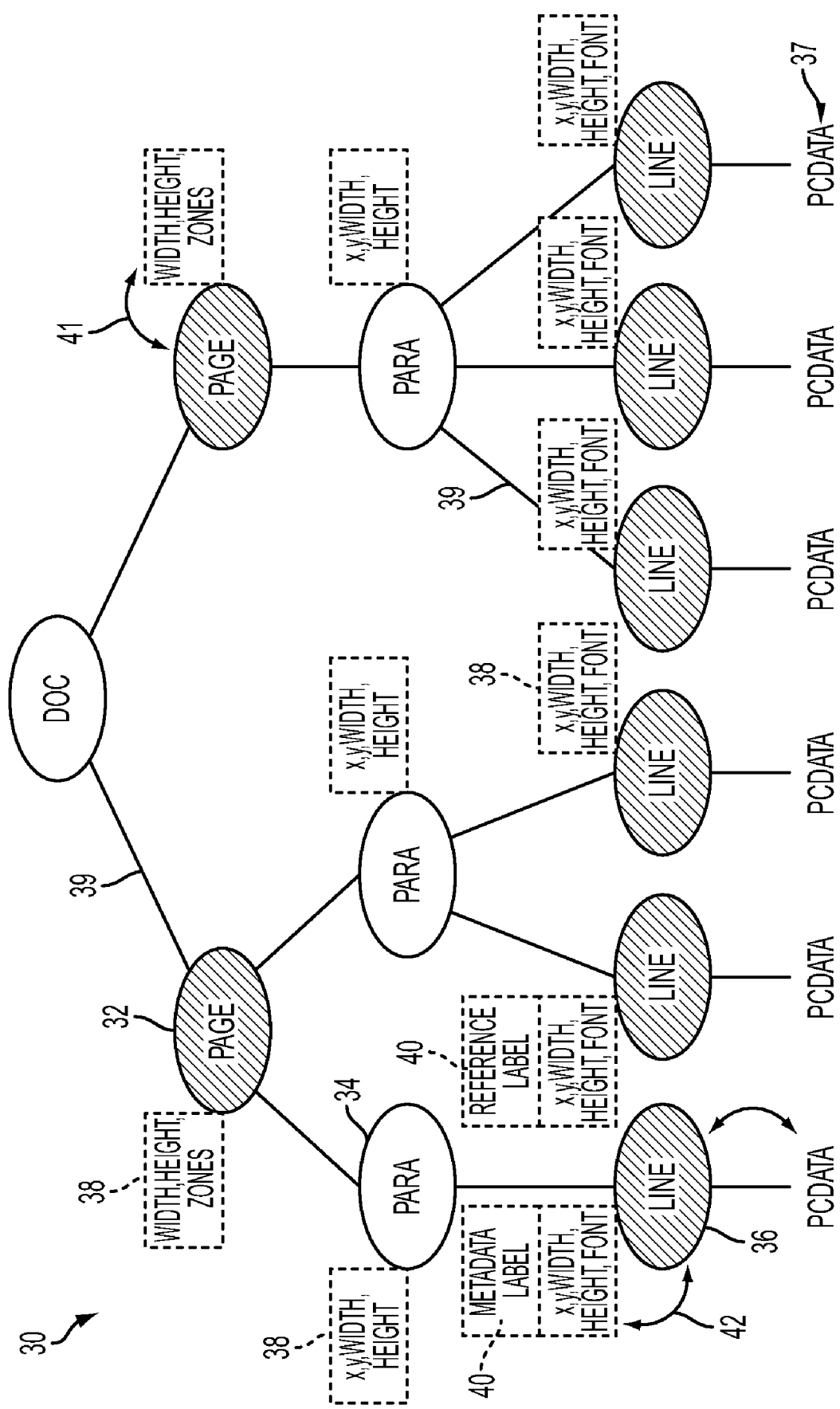
FIG. 2 is a dependency network in the form of a tree structure illustrating data elements of a part of an exemplary document to be annotated.

With reference to FIG. 2, an exemplary input document 12 to be annotated is shown in the form of a tree structure 30. In a tree structure, which is a form of a dependency network, nodes represent data elements of the document. Nodes can be linked to parent nodes by links, which ultimately connect the nodes to a common root node. The information in the tree is obtained from the original input document 12 and in the exemplary embodiment includes three types of data elements 32, 34, 36, namely PAGES, PARAGRAPHS, and LINES, which form nodes of the document and are ultimately linked to leaves 37. In the illustrated embodiment, the leaves 37 of the tree represent PCdata (text), although other information, such as image data, could also form leaves of the tree. The data elements 32, 34, 36 each have a number of characteristics 38, such as font type, position on the page, etc. The nodes are linked together by links 39. In the illustrated embodiment, at least some of the elements each include an associated label 40. The labels 40 may include information, such as whether the data element 32, 34, 36 is a title, a chapter heading, a reference, a part of a table, or the like. The labels 40 may thus be considered to be each associated with a respective class of labels, selected from a finite set of classes. Static features 42 may be defined between the data elements' characteristics and the corresponding node labels 40 (only a few of these static features are shown for illustration purposes). As will be appreciated, for a typical document 12, the tree structure representing it includes many more of the page, paragraph and line elements 32, 34, 36.

Figure 3:
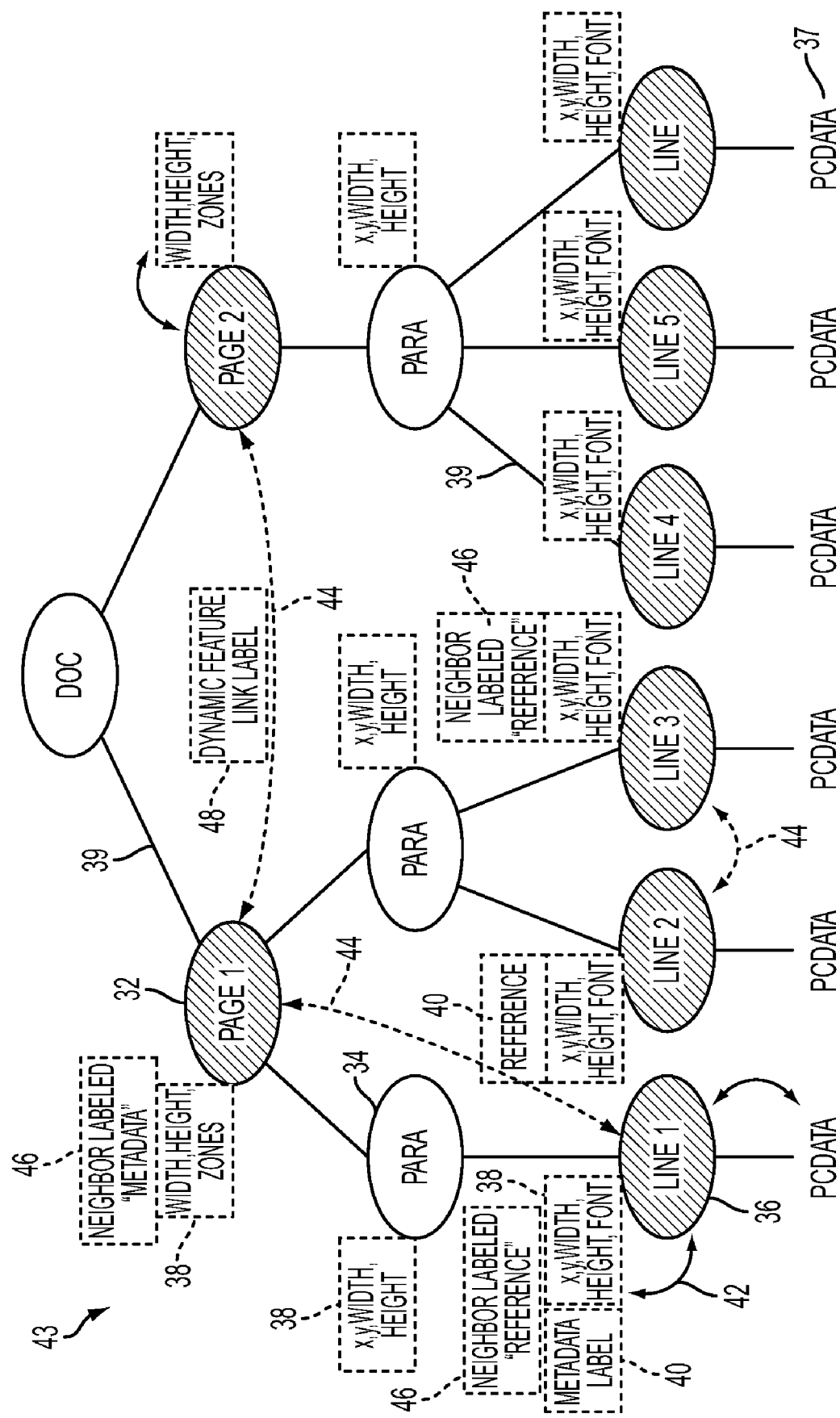
FIG. 3 illustrated the links created by annotation of data elements with dynamic features in the document of FIG. 2.

FIG. 3 shows a structure of the same document 12, after adding dynamic features and annotation. Now, the structure is no longer that of a tree, where each node has a parent and one or more child links only, but forms a relational dependency network 43. Here, new links 44 have been created between some of the typed elements 32, 36 as indicated by the dashed arcs (only a few are shown for simplicity). It is to be appreciated that a pair of nodes can be linked by an existing link 39 provided explicitly by the input document schema, such as a link between a child node and its parent node, by virtue of a dynamic feature, or can form a new link 44. At least some of the data elements 32, 36 that are linked by virtue of the dynamic features have their existing labels 40 extended with information from the linked element, here illustrated as neighbor labels 46. The neighbor labels 46 are assigned based on the confidence estimates provided by the classifier 18. In addition, the new links 44 created by the dynamic features can also be labeled, here illustrated by a dynamic feature link label 48.

As an example, one neighbor label 46 provides information that the associated line data element 36 can be labeled as a "reference" since the classifier 18 has estimated that there is a high level of confidence that that data element should be designated a reference as is the neighboring line data element in its label 40.

The exemplary system 10 and method disclosed herein facilitate the annotation of semi-structured documents, such as HTML or layout-oriented documents. To represent domain-specific knowledge, the method captures long distance relationships between data elements of input structures, thus inducing complex undirected dependency graphs. Since the learning and inference on graphical models is generally prohibitively expensive, the dependencies are simulated with a dependency networks (DN) technique. Moreover, to accelerate the inference, a stacked assembly principle is applied. In one aspect of the exemplary method, stacked dependency graphs are generated for a supervised learning mode.

Figure 4:
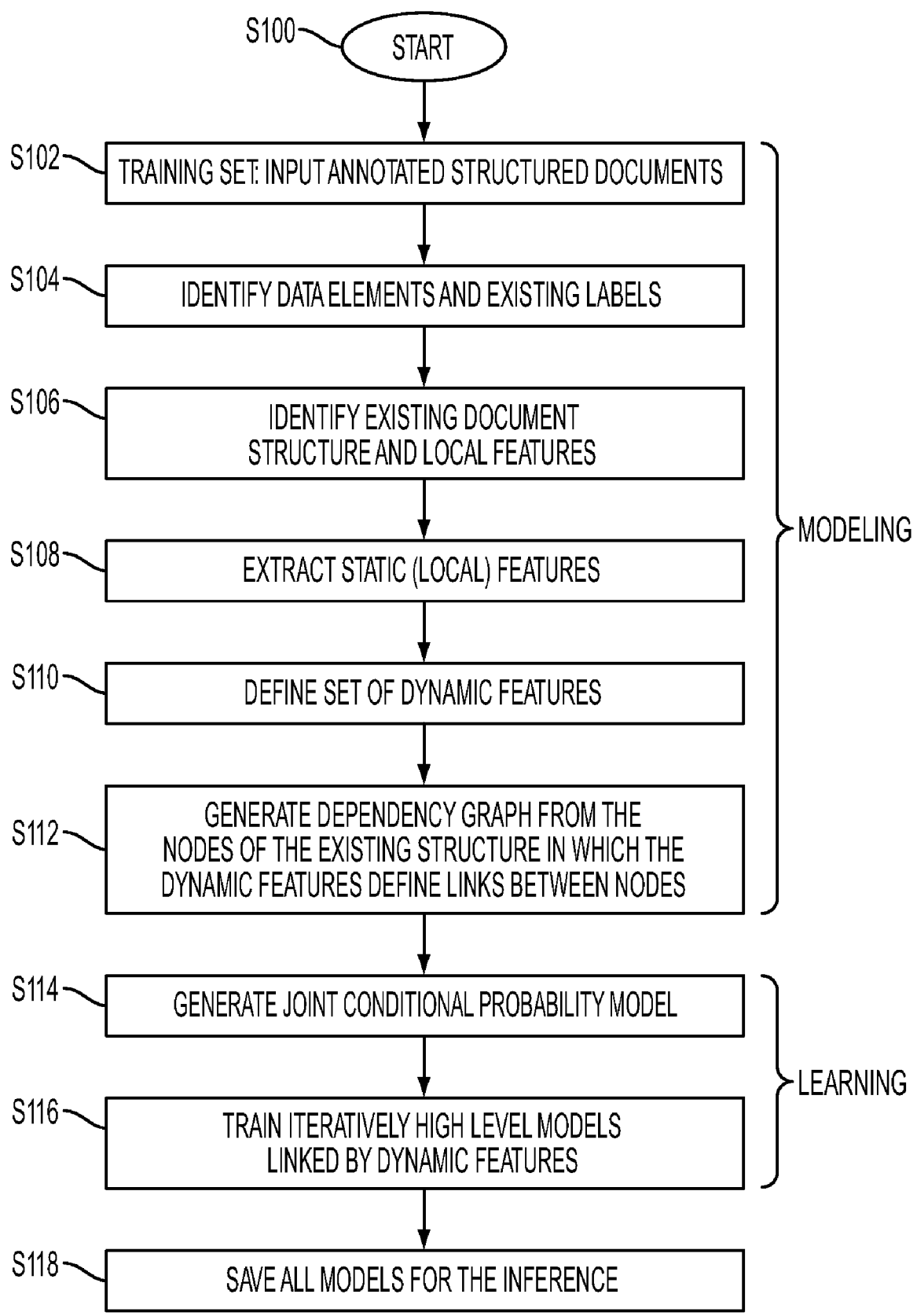
FIG. 4 is a flow chart which illustrates training of a model to be used in an annotation method in accordance with one aspect of the exemplary embodiment.
Figure 5:
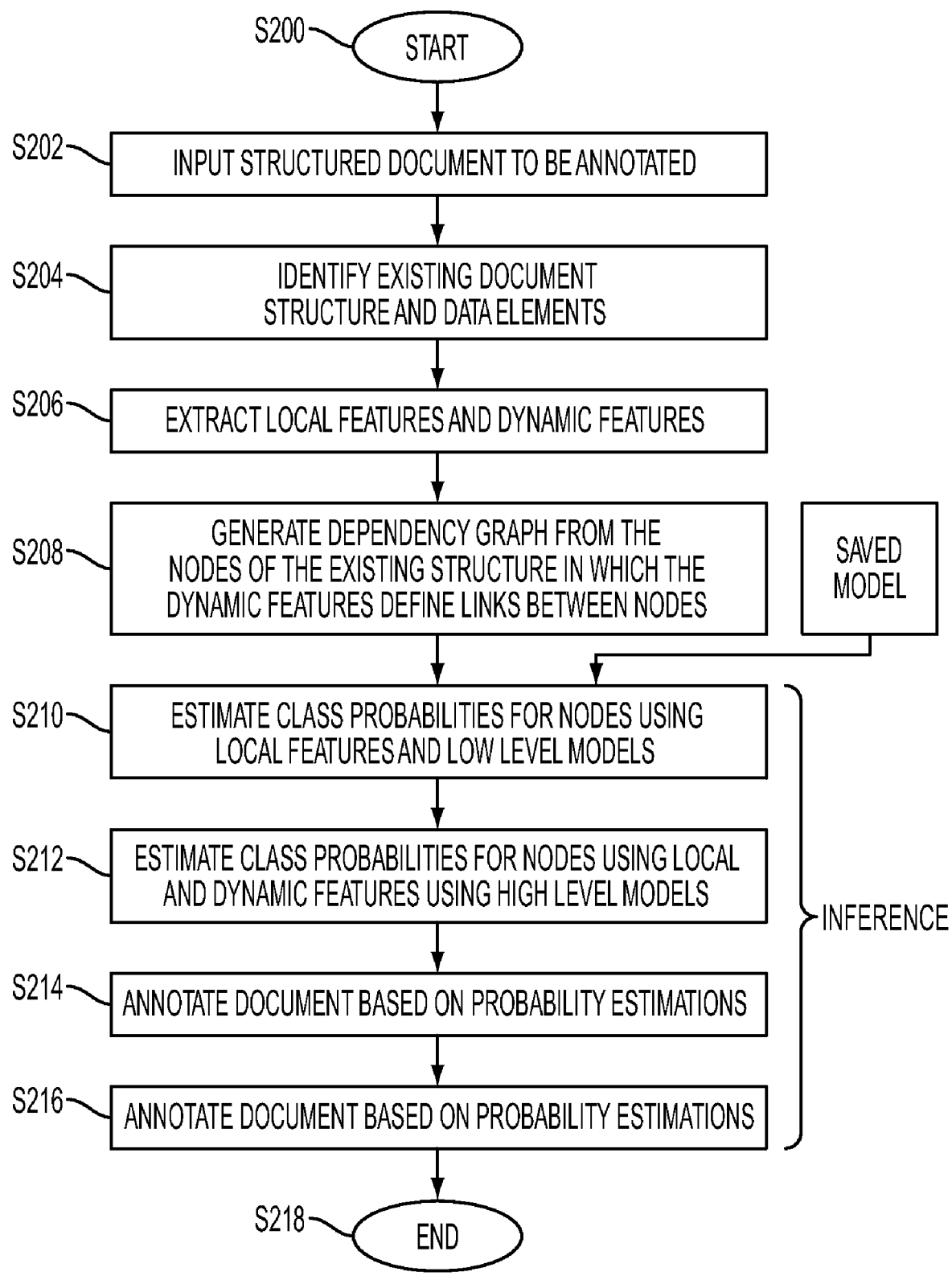
FIG. 5 is a flow chart which illustrates inference in the annotation method in accordance with one aspect of the exemplary embodiment.

FIGS. 4 and 5 illustrate flowcharts for an exemplary method for annotating a document. FIG. 4 illustrates the training of a classifier 18, which may be performed using a large set annotated documents. FIG. 5 illustrates the use of the trained classifier in annotating documents. The method of FIG. 4 begins at S100. At S102 a training set comprising semi-structured documents is input. Each of the input documents, like document 12 described above, has some structural information associated with it which can be used to generate a dependency network. Each of the training set documents may comprise, for example, a book, a scientific publication, a technical manual, a scanned business card, an HTML document such as a Web page, a group of such documents, or a portion thereof.

At S104, document data elements 32, 34, 36 (such as pages, lines, paragraphs) and their existing labels 40 are identified for each document. In an XML document, these may be identified from the XML tags. At S106, the existing structure of each training set document is identified in which nodes are defined by data elements 32, 34, 36 and the relationships between them are defined by their existing labels 40. At S108, static features 42 are defined which formally express the relationships between the characteristics 38 and the existing labels 40. At S110, a set of dynamic features is defined. Some of the features may be domain specific and may be defined by a user. In the exemplary embodiment shown in FIGS. 2 and 3, the dynamic features are relationships between two of the types of data element: LINEs 36 and PAGEs 32. These same dynamic features will be used in the method of FIG. 5. As will be appreciated, S110 can be performed at any time prior to S112.

At S112, for each document in the training set, a dependency graph is generated from the nodes of the existing structure in which the dynamic features define links 44 between nodes 32, 36. This ends the modeling stage.

At S114, the learning stage begins. Low level models are trained for the each of the nodes using the static features 40. Each of the low level models is a probabilistic classification algorithm which models neighbor labels for a small subset of the data elements 32, 36. The low level models are local learning models, i.e., they each focus on a small subset of the data elements. In particular one low level model may estimate the probability that a given data element should be labeled with a class label, for each class of labels. At S116, higher level models for nodes linked by dynamic features are iteratively trained. At S118, all of the models that have been learned through the preceding steps are saved, to be used later in the inference stage (see FIG. 5).

FIG. 5 illustrates a flowchart of an exemplary method for annotating a document. The method assumes the existence of a classifier 18 trained, e.g., as described in FIG. 4, to assign probabilities to elements by virtue of the dynamic features. In the exemplary embodiment, the classifier is one which has been trained on a large set of annotated documents. The method begins at S200. At S202 a new document 12 to be annotated is input (i.e., not one of the training set). As discussed above, the input document 12 has some structural information associated with it which can be used to generate a dependency network. The input document 12 may comprise, for example, a book, a scientific publication, a technical manual, a scanned business card, an HTML document such as a Web page, a group of such documents, or a portion thereof. At S204, the existing document structure is identified. This includes identifying the document data elements 32, 34, 36 (such as pages, lines, paragraphs) and their existing labels 40. In an XML document, these may be identified from the XML tags. The existing structure of the document is then identified in which nodes are defined by data elements 32, 34, 36 and the relationships between them are defined by their existing labels 40. At S206, local and dynamic features are extracted. The extracting of static features involves formalizing the relationships between the characteristics 38 of an element and its existing label 40. Extraction of dynamic features includes identifying pairs of data elements which meet the predefined criteria (established at S110) for being linked by a dynamic feature. As noted above, the dynamic features, previously defined for training the classifier, at S110, are relationships between two of the types of data element: LINEs 36 and PAGEs 32. At S208, a dependency network is generated from the nodes of the existing structure in which the dynamic features define links 44 between nodes 32, 36.

At S210, the inference stage begins. Class probabilities for the nodes are determined using the local features 42 of these nodes and the trained low level model(s) stored in memory. In particular, the data elements 32, 36 in the modeled dependency network are labeled by probabilistic classification algorithms which assign low level model predictions. These are generated by training the low level models previously developed on static features associated with the input document 12. In this step, the low level model predictions are developed by the trained classifier 18 for those nodes that are linked by dynamic features. Each of the low level model predictions predict neighbor labels for a small subset of the data elements 32, 36 that are to be collectively annotated later.

At S212, the low level models may be refined through one or more levels. Class probabilities for the nodes are then determined using the local features and dynamic features and the high level models stored in memory.

At S214, a joint conditional probability model is developed for the document by stacking the low level models. At S216, the document 12 is annotated with labels based on the class probability estimations for the nodes in the joint conditional probability model and an annotated document 22 is output. The method ends at S218. A description of various aspects of the system and method follows.

The method finds particular application in performing large scale document annotation tasks. Any task can be modeled as a collective annotation of a group of related instances rather than annotation for each instance separately.

In accordance with one aspect of the exemplary embodiment, stacking inference is used for the semantic annotation of semi-structured documents in the supervised mode (S214). This permits the training of a model, with local features being extended with the estimations of dynamic features (neighbor elements labels). To avoid the training-testing mismatch, the stacking uses an internal cross-validation within the model learning.

In conventional active learning methods, at any given moment, the model copes with one type of data elements only (for example, LINEs 36 in logical XML documents), and it requires an explicit switch when processing another element type (such as PAGEs 32). This limitation comes from the heterogeneity of features associated with different types of data elements. This relational nature results in incompatibility of predictions by classifiers associated with the different types of elements.

The present method provides an alternative approximation technique which can be applied to large scale document annotation tasks. The method allows any number of dynamic features to be defined by a user, each one capturing domain-specific knowledge in documents. The method permits any number of the dynamic features to be included in the undirected complex dependency graph. The user-defined dynamic features infer a relational dependency network (RDN) where both document elements 32, 34, 36 and links 44 can be identified by their type. This allows both elements and links to be annotated/classified.

The exemplary approach to approximating undirected graphical models is an extension of the stacked assembly principle. For dependency graphs of any complexity, this method allows a globally trained model 21 to be decomposed into a set of local learning models, where static features are extended with the estimations of neighbor element labels. The decomposition allows a considerable reduction in the model training time, without a substantial measurable drop in the accuracy of the solution. Algorithms are used that guarantee the structural consistency. Moreover, under some generic conditions, it can be shown that the inference on stacked RDNs asymptotically convergences to a consistent probability distribution.

1. Document Annotation Modeling

In the following description, the input data is given by a structure describing a set of elements in document(s) and relationships among them. In the case of Web pages, this structure is given by HTML tag nesting and/or hyperlinks. In the layout-based documents, the structure represents the spatial nesting ("contains") of document fragments and include elements like PAGEs, LINEs, PARAGRAPHs, TABLEs, etc. In other document applications, like forms or business cards recognition, the 2-dimensional page analysis can help establish spatial logical relationships between the elements, like "touch," "intersect," etc.

The shift from separate to collective annotation of elements is enabled through the mechanism of dynamic features.

Figure 6:
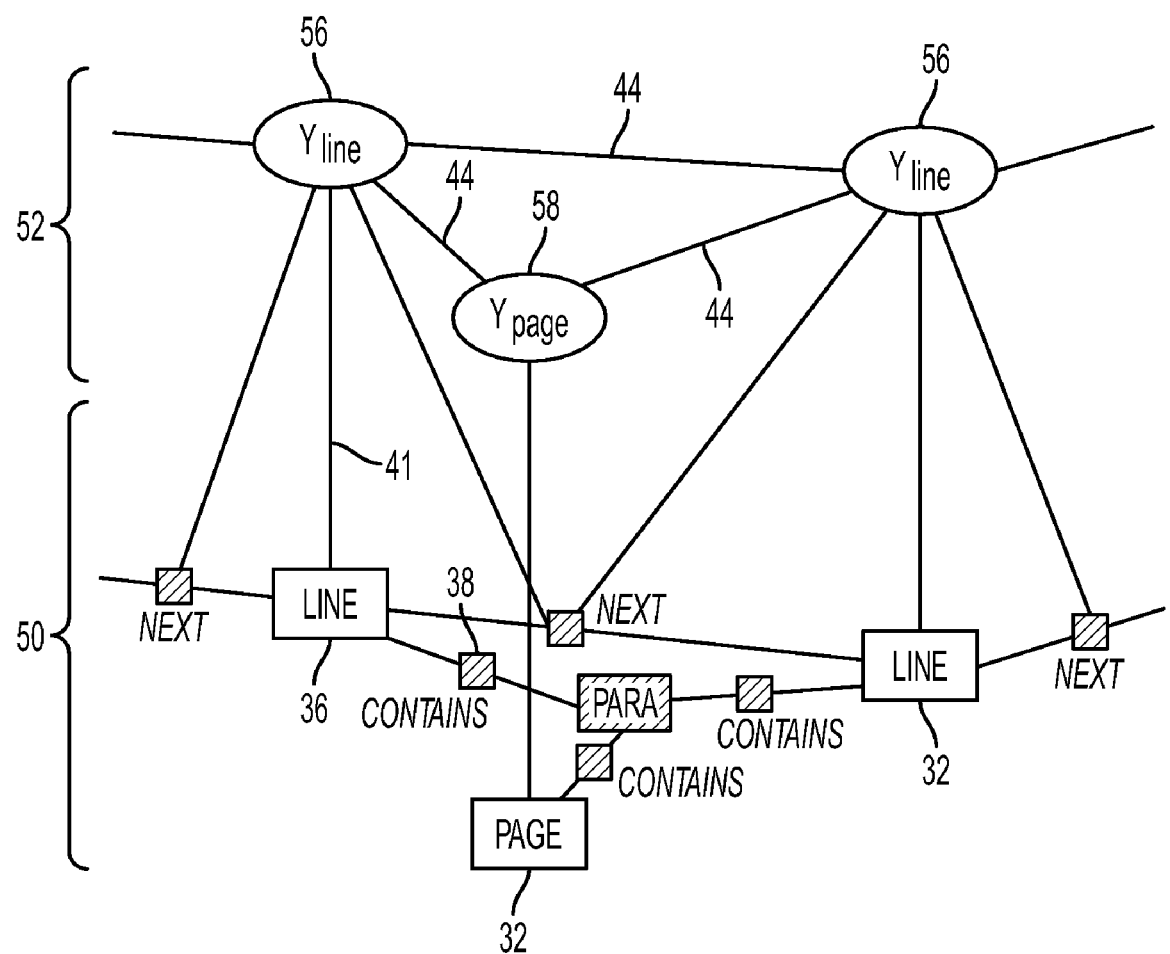
FIG. 6 illustrates an annotation scenario for collective element classification.

For illustrating (low level) models developed for the collective classification, two exemplary scenarios are presented in FIGS. 5 and 6. A two-layered graph representation is used to express both the input data and output collective annotation problem. The lower layer 50 describes the input data elements and relationships between them, and the upper layer 52 describes output variables and dependencies between them. In the first scenario, the collective annotation targets a group of input elements. FIG. 5 shows an example where the data layer 50 is a layout XML tree describing the input data given by typed elements (PAGEs, PARAGRAPHs, LINEs) and their spatial relationships ("contains," "next," etc). The upper layer 52 shows the variables on the selected nodes (PAGEs, LINEs to be classified with classes of dynamic features selected from $Y_{line}$ and $Y_{page}$, where, for example, $Y_{line}$ represents "reference" and $Y_{page}$ represents "metadata").

Figure 7:
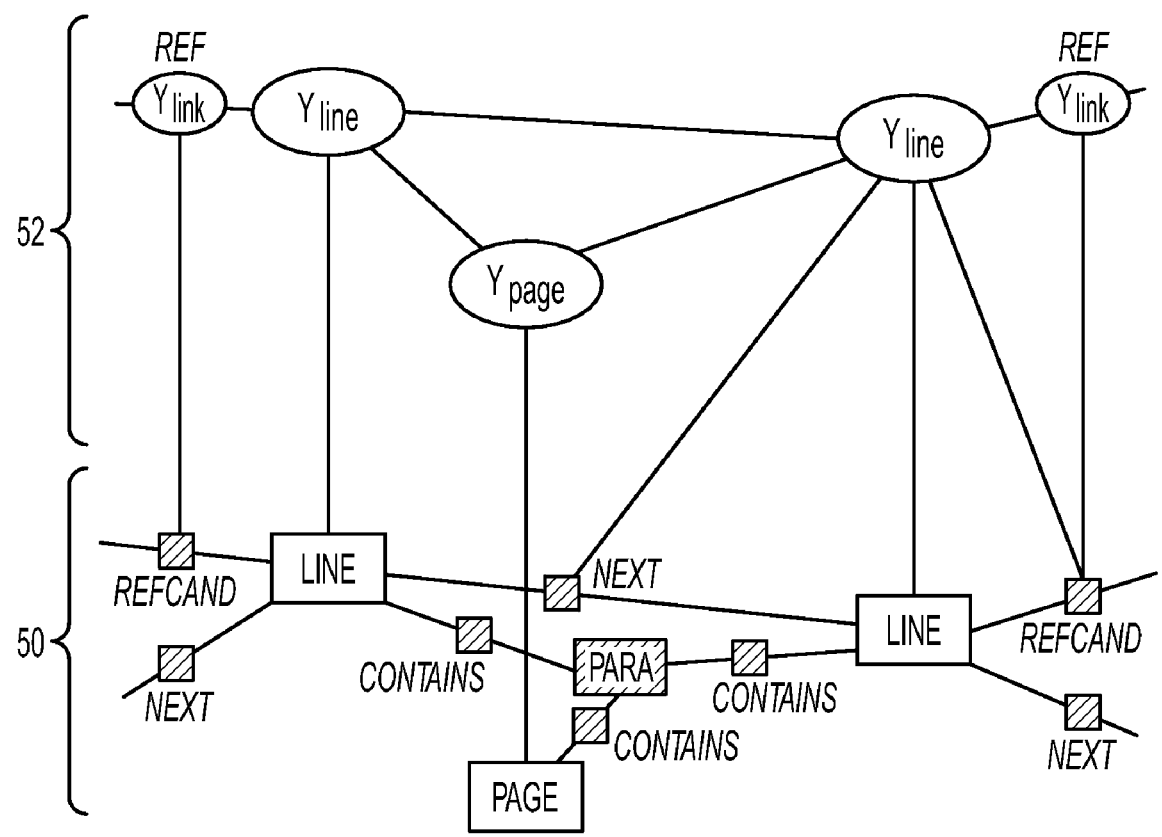
FIG. 7 illustrates an annotation scenario for collective element classification and link prediction.
Figure 8:
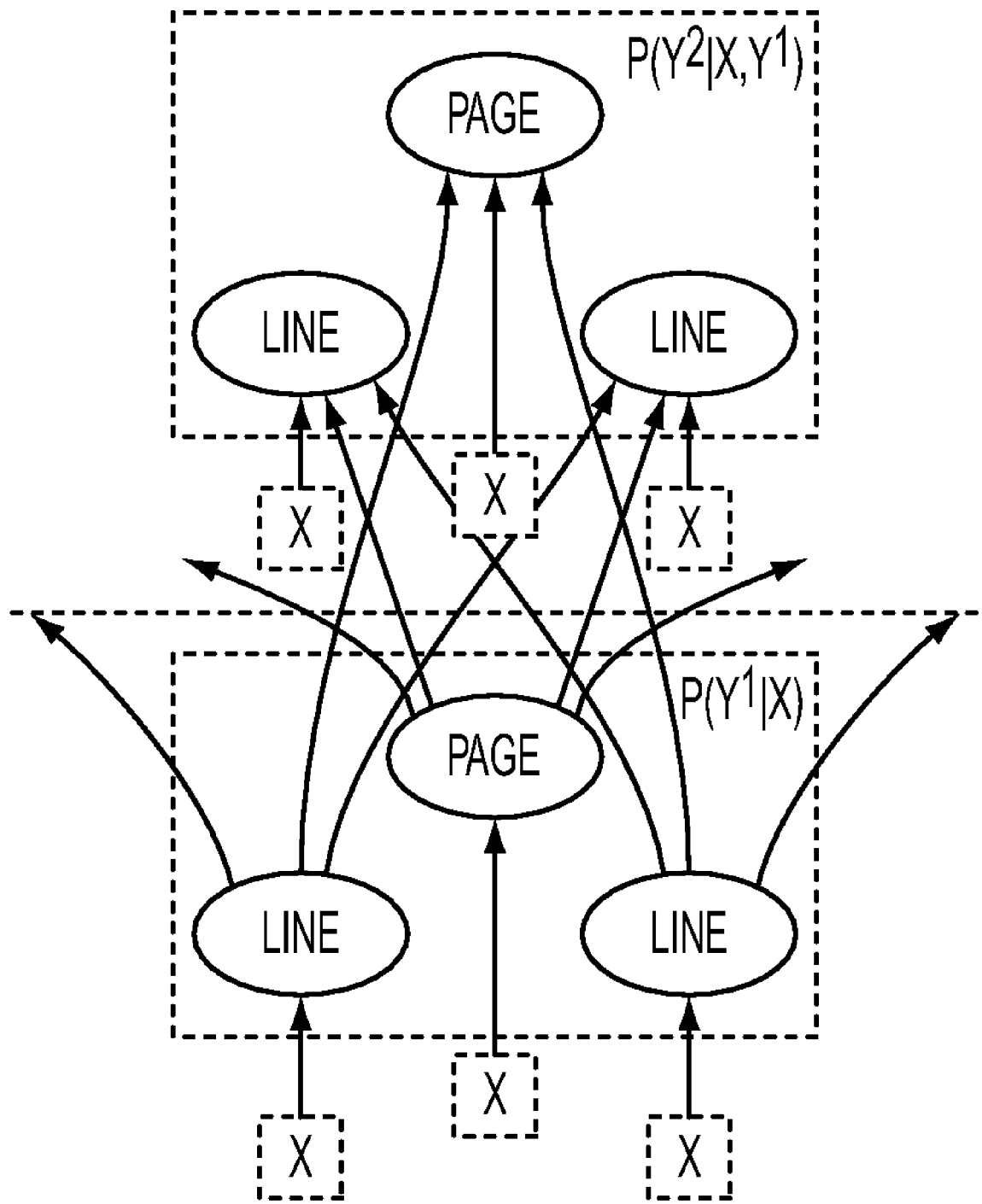
FIG. 8 illustrates a stacked dependency graph which is used to refine the low level models into one or more stack levels.

In the second scenario (FIG. 6), the collective annotation targets both input elements and relationships between them. In FIG. 6, spatial relationships are given in the input data, while other links, like "reference," are to be predicted. The goal is to label some pairs of input elements (x,x') with a relationship $r, r \in Y_{link}$ where, for example, $Y_{link}$ represents "TableOfContent_Reference" In certain cases, a list of potential pair candidates can be established on the preprocessing step and the inference should help determine the k most certain candidates (see FIG. 7 for the reference candidates (RefCand)).

Mapping from input data to dependency graphs (S106) is a basic step in the collective document classification modeling. The modeling stage includes the description of the (typed) variable set(s) and associating the variables to input elements. Further, it includes definitions and (typed) templates for both static and dynamic features on input data and output variables. Finally, the modeling covers the choice of basic structural classifiers and methods for the structure and parameter learning for the collective classification.

The link classification/prediction (scenario 2) is useful in different tasks. In the layout document annotation, for example, it uses the spatial proximity relationships (such as "contains," "overlaps") and the reading order "next" in order to predict the long distance (and often domain-specific) relationships between elements. Examples where such links may be useful include linking elements to indexes, Table-of-Content, figures, and tables. In the collective classification of Web pages or scientific publications, links between pages may be predicted with labels, such as "cited," "corefered," and/or "authored by."

1.1 Basic Classifiers

A basic component of the document annotation system is a supervised probabilistic classifier 18 of elements x (as exemplified by elements 32, 34, 36) in input documents 12. The classifier 18 is trained with the static features and, for each unlabeled element x, it estimates conditional probabilities P(y|x) for all labels y, i.e., the conditional probability that an element x should be labeled with a label y comprising information from another element's label.

In the following description, it is assumed that the classifier 18 is a maximum entropy classifier, as described, for example, in Adam L. Berger, Stephen Della Pietra, and Vincent J. Della Pietra, "A maximum entropy approach to natural language processing," *Computational Linguistics,* 22(1):39-71 (1996) (hereinafter Berger 1996). The application to other supervised classifiers, such as logistic regression or multi-class SVM, proceeds in a similar manner. With the constraints based on selected features $f_j(x, y)$, the maximum entropy classifier attempts to maximize the conditional likelihood P(y|x), which is represented as a log-linear function $$P(y \mid x) = \frac{1}{Z(x)} \exp\left( \sum_j \lambda_j \cdot f_j(x, y) \right),$$

where the parameters $\lambda_j$ are learned from the training corpus and Z(x) is a normalizing factor which ensures that all the probabilities sum to 1.

In layout documents, the classifier 18 may employ a set of static features composed of three types of information:

1. Content features express properties of text in the element x, e.g., $f_1(x, y)=1$ if y=title and text in x has only uppercase characters, 0 otherwise 2. Structural features capture the tree context surrounding an element, e.g., $f_2(x, y)=1$ if y=affiliation and y's parent node name is paragraph, 0 otherwise 3. Attributes features capture the values of node's attributes in the source tree (dependency network), e.g., $f_3(x, y)=1$ if y=title and the value of the font attribute of x is times, 0 otherwise Beyond the basic static feature set, the automatic feature selection can be used to combine basic features of different nodes x to determine compositions relevant to a given annotation problem. This approach allows the user to add information to the classifier by defining domain-specific features.

1.2 Dynamic Features

While the static features f(x, y) (such as static feature 41 in FIG. 5) describe the relationships between various characteristics g(x) of elements x and their labels y, dynamic features capture relationships between pairs of labels y of the elements.

A dynamic feature $f_\mathcal{P}(x, y, y')$ captures the relationship between an element x, its label y, and the label y' of another node (p-node) in the document structure, where $\mathcal{P}$ is a path in the structure from y to y'. For example, for an element x that is a LINE, a dynamic feature may be defined, such as: $f_p(x, y, y')$=1 if g(x) and y=author and y' is metadata, 0 otherwise, for some characteristic g(x) of the element x and path $\mathcal{P}$ from a LINE to the corresponding PAGE node ($\mathcal{P}$="ancestor:: PAGE" in XPath language). The set of dynamic features is generated by a template C, which is a triple (filter, path, g) where filter is (x .type=LINE) and path=$\mathcal{P}$. In a similar manner, dynamic features may be defined on link(s) between a pair of elements linked with path $\mathcal{P}$.

Dynamic features thus capture relationships between element labels and form complex structures. In the exemplary embodiment, rather than using Markov random fields, where finding exact solutions is computationally intractable, an approximation technique of dependency networks and their relational extensions for typed data is employed. By "typed data" it is meant that the data elements are each classified, e.g., according to LINE, PARAGRAPH or PAGE types. Furthermore, to improve the rate of convergence, a stacking principle for integrating dynamic features f(x, y, y') is used in the basic classifier as follows. When a true value of y' is unavailable, y' is replaced by an estimation of y', represented herein by ŷ'. In turn, the estimation model for ŷ' is trained on pairs (x, y') in the available training corpus.

2 Dependency Graphs and Stacking

In the exemplary embodiment, input documents 12 are represented by a dependency network in the form of a logical (XML) tree structure 30. As illustrated in FIGS. 5 and 6, the types of nodes to be annotated with labels y in the trees (output variables) are LINEs and PAGEs, although it is to be appreciated that other types of nodes could be selected for annotation.

In the tree 30, static features f(x, y) are defined between input node characteristics g(x) and node labels y Dynamic features are defined between each pair of neighbor LINEs and PAGEs, as well as between every LINE and corresponding PAGE element node. In FIGS. 5 and 6, some of the static features are shown as extra-layered links 41, they connect element nodes of the lower layer to label nodes of the upper layer. Dynamic features define links between label nodes of the upper layer.

Let G denote the dependency graph used in the collective classification, (such as a graph which incorporates the scenario illustrated in FIG. 5 or FIG. 6). Informally, graph G includes the elements in the input document, the links between them, as well as the upper layer 52 extended with extra-layered links 41. Formally, nodes in the dependency graph are input nodes x and all output nodes to be annotated with labels y (LINEs and PAGEs in FIG. 5). Two types of undirected arcs in G are induced by static features 41 and dynamic features 44 defined over the input data. An arc in G links a node x to node y if one or multiple local features are defined over the pair (x, y). Similarly, an arc in G links a node y to node y' if a dynamic feature is defined over the pair (y, y'). For any node y in the dependency graph, let $y_{nb}$ denote the vector or neighbor nodes of y (linked by an arc). For example in FIG. 5, $y_{nb}$ for the page node 32 are the two line nodes 36.

2.1 Stacking Procedure for a Dependency Graph

In the stacking procedure, a high-level model is used to combine lower-level models to achieve a greater predictive accuracy. See, for example, D. H. Wolpert, "Stacked generalization," *Neural Networks*, 5(2):241-259 (1992). Each low level model defines a relational dependency network. In the exemplary embodiment, the stacked generalization method is applied the relational dependency networks to avoid the need for Gibbs sampling. The high-level model is built using the extended training set (x, ŷ, y), where ŷ is one or multiple low-level model predictions for labeling data element x with label y.

Consider the simple case of collective annotation of two elements with labels y and y', in the presence of input data X. The annotation is given by the joint conditional probability p(y, y'|X). If y and y' are independent given X, p (y, y'|X) can be directly factorized as follows:

$$p(y,y'|X)=p(y|X)p(y'|X) \quad (1)$$

If y and y' are not independent, the exact solution assumes the enumeration of all possible annotations of y and y':

$$p(y, y' \mid X) = \frac{p(y, y', X)}{\sum_{(y,y')} p(y, y', X)} \quad (2)$$

$$= \frac{1}{Z_0}\exp\sum_j (\lambda_j f_p^j(y, y', X))$$

The relational dependency network (RDN) approximates the exact solution by factorizing the joint probability and injecting the estimations as follows:

$$p(y,y'|x) \approx p(y|\hat{y}',X)p(y'|\hat{y},X) \quad (3)$$

where ŷ' and ŷ, are estimations of y' and y, respectively.

In the stacked version of RDNs, a number of these approximation models are stacked. In each model, the collective annotation p(y,y'|X) in the dependency graph is approximated by 2l models $p(y^i|\hat{y}^{i-1}, X)$ and $p(y'^i|\hat{y}^{i-1},X)$=(i=1, . . . , l, where $\hat{y}^{i-1}$ and $\hat{y}'^{i-1}$ are predictions for y and y' made on the previous level model, and l is the stack size. The stack size corresponds to the number of levels, i.e., the number of times the model is refined. For example, l can be from 1 to 5, or more.

In the general case of the dependency graph G, the function neighbor( ) determines the neighbors $y_{nb}$ to which the given y is linked with dynamic features in G, $y_{nb}$=neighbor(y). Then, the stacked RDN approximation factorizes the joint distribution over y on the each level of the stack as follows:

$$p(\hat{y}^i \mid X) \approx \prod_{y^i \in y^i} p(y^i \mid \hat{y}_{nb}^{i-1}, X) \quad (4)$$

The stacking method constructs samples of (X,Ŷ) where Ŷ is a vector of class predictions for input data X. To avoid the mismatch between data used in the training set and the testing set, a cross-validation principle may be applied inside the learning algorithm. The next section presents the learning and inference algorithms in detail.

2.2 Supervised Learning on Stacked RDNs

The learning algorithm for training the classifier 18 (used in S114, S116 in FIG. 3) may be represented as follows in Algorithm 1.

Algorithm 1:

Learning algorithm. Given a training set $S^0 = \{(X;Y)\}$, a basic learning method M, a cross-validation parameter K and a stack size l.
Split $S^O$ into K equal-sized disjoint subsets $S_1^0, \ldots S_K^0, S = \cup_{k=1}^K S_k^0$
for i = 1, ..., l do
    for k = 1, ..., K do
        1. Get function $F_k^i$ by training the basic method M on the set $S^{i-1} - S_k^{i-1}$
        2. Construct an extended dataset $S_k^i$ of instances $\{(x;\hat{Y}_{nb}^i), y\}$ by extending each $x(x,y) \in S_k^0$ with estimations of neighbor nodes using function $F_k^i$, $\hat{Y}_{nb}^i = F_k^i(x, Y_{nb}^{i-1})$
    Compose $S^i = \cup_{k=1}^K S_k^i$
return functions $F^i$ by training the basic method M on the sets $S^i$, i = 1,...,l.

The learning procedure generates K□l functions $F_k^i$= 1, ..., K, i=1, ..., l to produce the extended datasets for all levels and returns l functions $F^i$ which are used in the inference algorithm (applied in S210, S212 in FIG. 5). An exemplary inference algorithm may be as follows in Algorithm 2:

Algorithm 2:

Inference algorithm. Given an input document $X^0 = \{x\}$
for level i = 1,...,l do
    1. Produce estimation for i-level $\hat{Y}^i = F^i(X^{i-1})$
    2. Produce an extended set $X^i = \{(x, \hat{Y}_{nb}^i)\}$
return the estimation for the last level $\hat{Y}^l = F^l(X^l)$ Under some generic conditions, it can be shown that the inference on stacked RDNs asymptotically convergences to a consistent probability distribution.

2.2.1 Typed Stacked Learning

If the input documents 12 have nodes of different types, so does the dependency graph. For example, in the document annotation example (FIG. 5), there are three types of nodes referring to three different types, LINEs, PARAGRAPHs and PAGEs. Each node type is associated with the proper class set and is characterized with an associated feature set. Consequently, learning a model for the input documents requires training T type-associated models, one model per type, e.g., a LINE model, a PARAGRAPH model, and a PAGE model in the exemplary embodiment. In the stacking generalization, each function $F^i$ trained with M algorithm is decomposed into T typed functions $F^{i,t}$, t=1, ..., T.

2.2.2 Probabilistic Versus Deterministic Classifiers

In the stacking approximation (Eqn. (4)), the estimations $\hat{y}$ for node labels y may be interpreted in a deterministic or a probabilistic manner. In the deterministic mode, $\hat{y}$ is assumed to be the most probable class for y. If the basic classifier M is probabilistic, then the most probable class in $\hat{y}$ can be replaced with the vector of class probability estimations to reduce the estimation error impact. For example, the classifier 18 may be a maximum entropy classifier, which, like many other methods which may be used, is probabilistic. Eqn. (4) can be rewritten explicitly as follows:

$$p(\hat{Y}^i \mid X) = \prod_{y^i \in Y^i} p(y^i \mid \hat{P}(Y_{nb}^{i-1}), X), i = 1, \ldots, l, \quad (5)$$

where the $\hat{P}(y) = (\hat{p}_1(y), \ldots, \hat{p}_n(y))$ is the estimation probability vector and $\hat{p}_i(y)$ is the estimation probability of labeling Y with the i-th class.

3. Structure Learning in Stacked RDNs

The fast inference with stacked RDNs makes it attractive to consider adding more links to the dependency graph in order to catch the long distance relationships between output elements with no significant loss in the training/inference time. The addition of links is opposite to the conventional graphical methods which look for independence and discard links in order to fit a certain graph class (like strings or trees) where the exact solution is tractable.

In the exemplary embodiment, the dynamic features are considered as defining 1-neighbors in the dependency graph G and can be generalized to any neighborhood. In the straightforward case, the initial graph G can be extended with all m-neighbors f (y, y', x), y'=neighbor (y) for a fixed m>0. For input data given by XML trees, an XML path language, such as Xpath can be used to recursively define m-neighbors by composing paths $\mathcal{P}_{m-1} \circ \mathcal{P}$, where $\mathcal{P}$ is a path in dynamic feature definitions and $\mathcal{P}_{m-1}$ is a m−1-neighborhood path, m>1. For example, if k=2, $\mathcal{P}_1$="/ancestor::PAGE" and $\mathcal{P}$="/following-sibling::*", then the composition $\mathcal{P}_1 \circ \mathcal{P}$ is a 2-neighborhood path that retrieves the right brother of a given LINE element's PAGE ancestor.

The number of paths grows exponentially with m; thus the most relevant paths can be selected by applying existing feature selection (FS) methods, such as the entropy-based interaction method, as described, for example, in Guangzhi Qu. "New measure: A new dependency and correlation analysis for features," in Proc. ACM KDD (2005). Such a method ranks m-neighbor links by their interaction with y and keeps only the top ones. When using the initial data set $S^0$, the neighborhood function neighbor(y) is global on all stack levels, neighbor(y)=FS($S^o$).

In various embodiments, the method may go one step further and apply the neighborhood selection on each stacking level i to extended sets $S^i$, i=1, ..., l. The neighborhood function y'=$\text{neighbor}_k(y,i)$ then becomes local and specific to a given level i, $\text{neighbor}^i(y)$=FS ($S^i$), i=1, ..., l.

The structural inconsistency in stacked RDNs can be avoided by the symmetric path addition, according to which adding any link $\mathcal{P}$ to the template neighbor( ) implies addition of the inverse link $\mathcal{P}^{-1}$. A greedy algorithm can be deployed to select path pairs $(\mathcal{P}, \mathcal{P}^{-1})$ which interact the most with true classes Y.

The interaction between the true class vector $\mathcal{P}$ and a value vector V, denoted I(V,Y), measures the entropy-based correlation between Y and V and recalls the conventional correlation used in linear methods. Let $\mathcal{I}(X,Y,i,\mathcal{P})$ denote the interaction between the true class vector Y and the estimation vector $\hat{Y}^i$ for all elements $X'=\mathcal{P}(X)$ in the training set $S^i$:

$$I(X,Y,i,\mathcal{P}) = \{I(Y, \hat{Y}^i) \mid Y=y(X), Y^i=\hat{y}^i(\mathcal{P}(X))\}$$

In Algorithm 3 below, a path $\mathcal{P}$ is selected together with the inverse path $\mathcal{P}^{-1}$. The feature selection (FS) intervenes with the Learning algorithm (Algorithm 1) at the end of loop for level i. Once the training set $S^i$ is completed for the level i, the FS algorithm (Algorithm 3) is run to determine the set of paths that will compose function $\text{neighbor}_i()$ used at the next level i+1. The added paths can be limited by the maximum length m, where m can be, for example, between 1 and 5.

Algorithm 3

Structure learning for stacked RDNs at the level i.
Given a training set $S^i =((X,\hat{Y}^i),Y)$.
Let $P_D$ be the set of paths of dynamic features definitions.
$neighbor_1{}^i =P_D$
for m = 2,3,... do
  for $\mathcal{P} \in neighbor_{m-1}{}^i$ do
  rank paths $\mathcal{P} \in P_D$ by interactions $\mathcal{I}(X,Y, \mathcal{P'} \circ \mathcal{P} i,) + \mathcal{I}(X,Y,(\mathcal{P'} \circ \mathcal{P}^{-1},i))$.
  for the k top interactions, add $(\mathcal{P'} \circ \mathcal{P})$ and $(\mathcal{P'} \circ \mathcal{P})^{-1}$ to $neighbor_m{}^i$.

Beyond the Learning algorithm (Algorithm 1), the structure learning has an appropriate impact on the Inference algorithm (Algorithm 2), where the extended sets $x^i$ are produced using $neighbor_i()$ for each level of the stack.

In summary, an exemplary learning system for the annotation of semi-structured documents is composed of the following components:

1. A training set of input data (X,Y) that includes
  a) a set of typed input elements X={X} with an associated set of static features f(x, y)
  b) a set of typed element relationships r(x,x);
2. The (output) dependency network defined by the template of (element and link) variables and dynamic features $f_p(y,y',X)$;
3. The algorithm for stacked RDN parameter training (Section 2.2, Algorithm 1), interleaved with algorithms for the structure learning for each level of the stack (Algorithm 3);
4. The inference algorithm for stacked RDNs (Section 2.2, Algorithm 2).

The exemplary method allows modeling of the semantic annotation of layout-oriented documents. The modeling is implemented as a mapping from input data to dependency graphs on typed nodes and links which are subjects of the collective classification.

The initial dependency graph is defined by (static) features that capture relationships between input elements and their labels and by (dynamic) features that capture relationships between elements' labels. The principle of relational dependency networks is applied to the initial dependency graph and extended with the stacking generalization in order to train the prediction models for the collective classification of elements and links. The main advantage of stacked RDNs is the fast inference of complex models, when compared to the Gibbs sampling. Moreover, it has been shown how to couple the stacked RDNs with the structure learning in order to explore long distance dynamic features and further improve the model accuracy.

Without intending to limit the scope of the exemplary embodiment, the following example compares the results of the exemplary method with those of other methods.

EXAMPLE

In this Example, the method employing stacked RDNs (referred to herein as Stacking) is compared to other methods. The lower bound in the evaluation may be considered to be the Basic or "Independent" method (also referred to as the Intrinsic method) given by Crf++: "Yet another CRF toolkit", available at http://crfpp.sourceforge.net/ (hereinafter CRF++) where the dynamic features are ignored and the prediction models are trained using the static features only. As the upper bound for the stacking approximation, the "Exact" solution according to Berger (1996) may be considered. However, when the learning or inference of exact solutions is intractable because of the large size of input documents and/or complexity of dependency graphs, another upper bound may be considered for the stacking algorithms ("Upper" method). Here, the upper bound solution is one where an oracle is assumed to correctly predict the neighbor classes. In the exemplary embodiment, the oracle-based models are built with the extended training sets where the true neighborhood values $y_{nb}$ augment explicitly the extended datasets for each y.

Moreover, the exemplary stacking method may be compared to the Gibbs sampling method (See Bishop 2006), which is a Markov chain Monte-Carlo algorithm used when the inference is intractable. Gibbs sampling proceeds by replacing the value of one of the variables y by a value drawn from the distribution of y conditioned on the values of the remaining variables. In other words, it replaces y by a value drawn from the distribution $p(y|Y_{nb},X)$. The sampling procedure is repeated by cycling through the variables in y and choosing the variable y to be updated at each step. In the present evaluation, the initial variable values $y^0$ are provided by the Basic method. Variables $y_m \in Y$ are taken randomly. At iteration j, j=1, . . . , J, the $y_m$ is sampled, as follows:

$$y_m^{j+1} \sim p(y_m | y_1^{j+1}, \ldots, y_{m-1}^{j+1}, y_{m+1}^j, \ldots, y_M^j, X), \quad (6)$$

where M is the total number of variables.

In the following, different tests are run to compare Stacking to the Basic, Upper, Gibbs and, where possible, Exact methods. The basic method M used in Stacking is the maximum entropy classifier. Tests were run on two different collections, which are referred to as the Sequence Collection and the Technical Collection.

1. Sequence collection: This collection is a set of 28 paper abstract sequences from the Virtual Information and Knowledge Environment Framework (VIKEF) collection (see http://www.vikef.net/) whose elements are annotated with six metadata classes. In the dependency graph generated for sequences, the element's neighborhood is given by its left and right elements. Due to the chain dependency graph, the CRF++ package can be deployed to obtain the exact solutions. For all tested methods, the accuracy of element annotation is estimated.

In the stacking methods, the stack size is varied from 1 to 8.5-fold cross-validation is used. The inner cross-validation parameter K is set to 2. In the first set of tests, the Stacking method is run on the sequence collection with the basic chain structure (neighbor(y) returns y's left and right brothers) and the results compared to Upper, Independent and Exact solutions.

Figure 9:
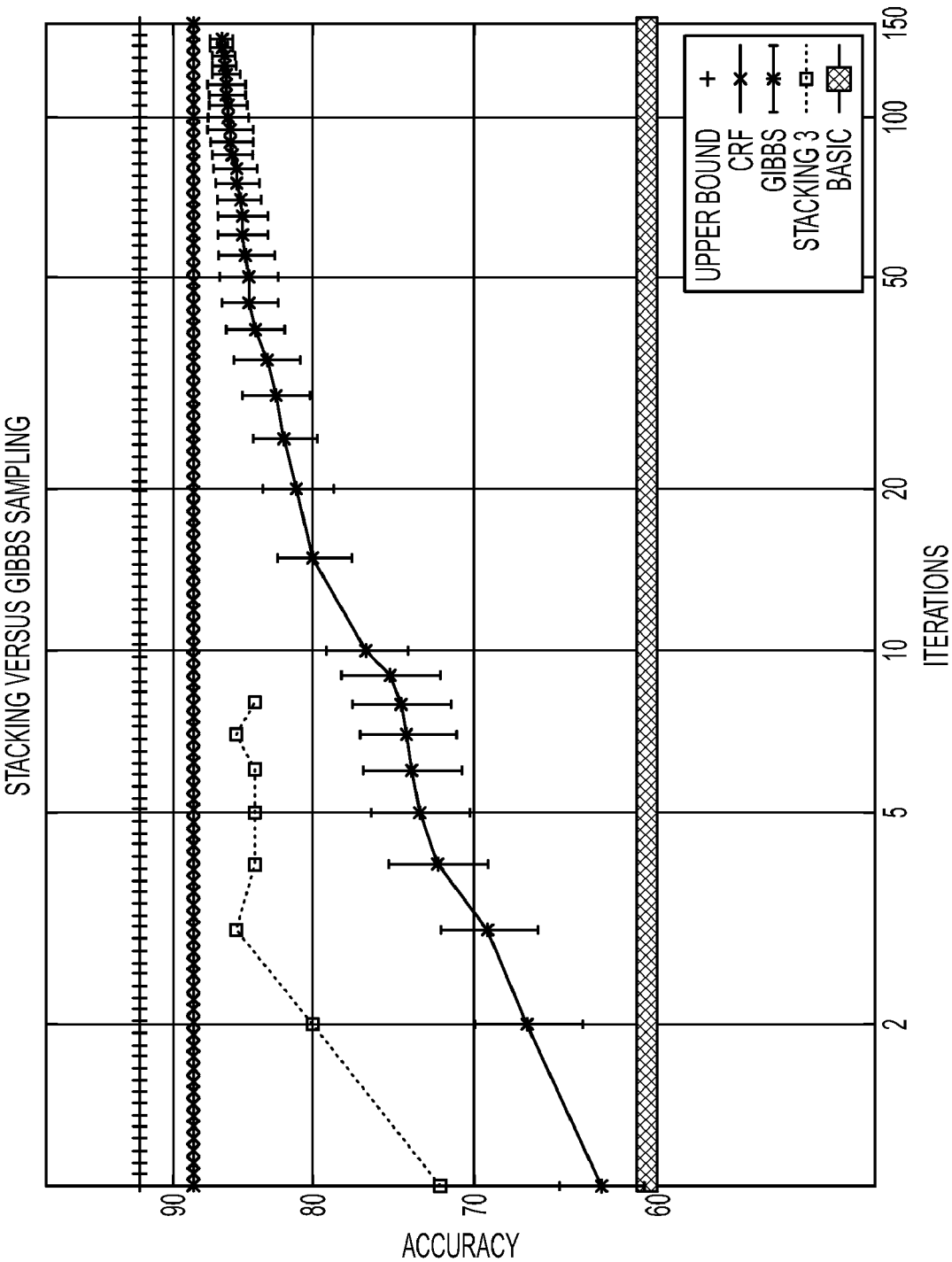
FIG. 9 illustrates the increase in accuracy for stacking and structure learning on dependency graphs.

Training of the Model is fast with both Stacking and Gibbs sampling methods. However, for the inference, as FIG. 9 shows, Stacking reaches the maximum accuracy in 3-4 iterations, while it takes about 90 iterations to achieve a similar accuracy with Gibbs sampling.

Figure 10:
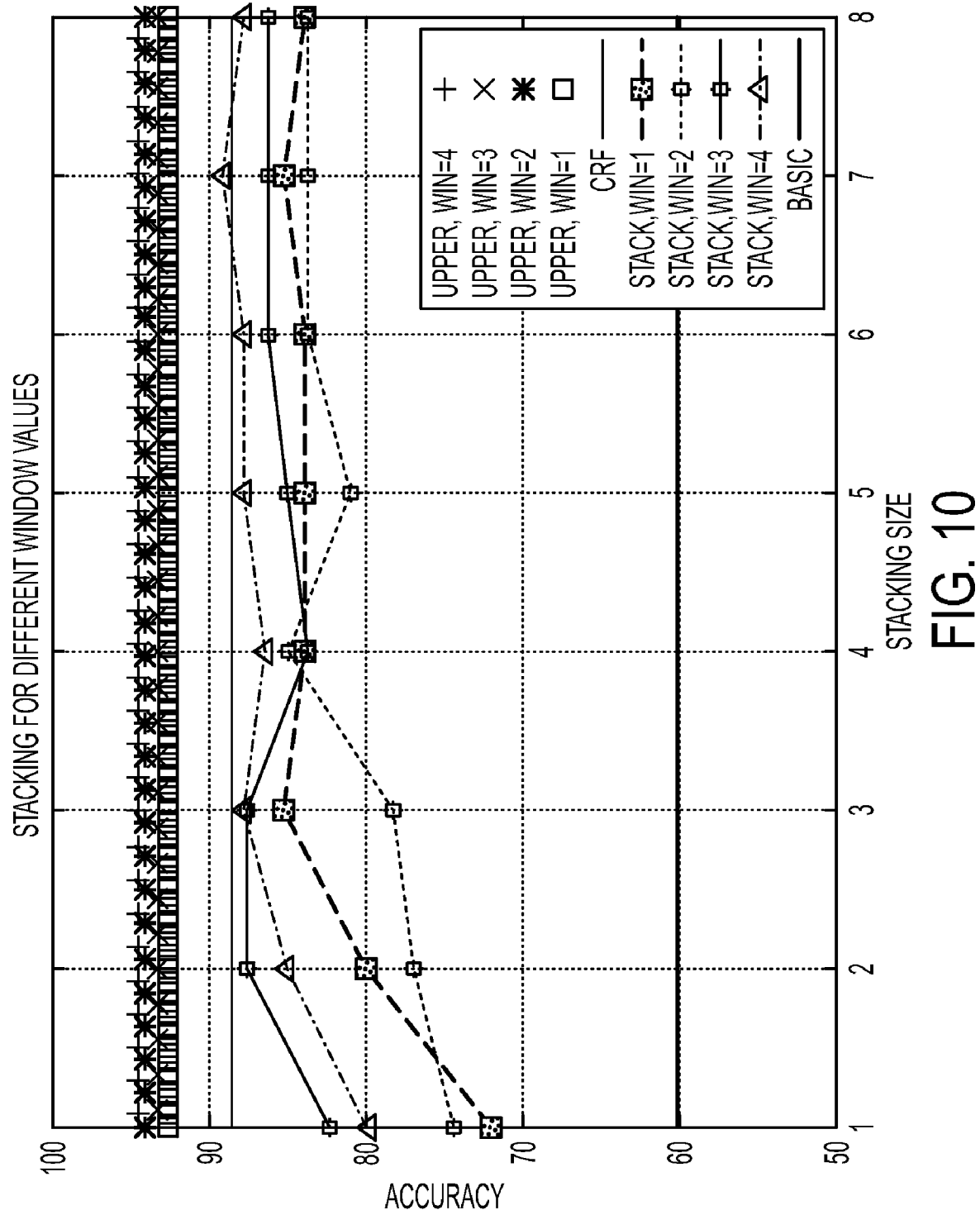
FIG. 10 illustrates the effect of window size on accuracy.

In the second set of tests, the Stacking method is run on the Sequence collection combined with the structure learning. A larger set of dynamic features is inferred from the basic chain structure using the interaction measure $\mathcal{I}(X,Y,i,\mathcal{P})$. The initial dependency graph is extended with m-distance neighbors. In the Sequence collection case, this corresponds to windows of size m varying from 1 to 4. The feature selection runs on each stack level. FIG. 10 shows the performance of all Stacking variants and compares them to Upper methods for the corresponding window sizes, Exact (available for the basic chain only, where the window size equals 1), and Basic methods. The structure learning and adding more relevant dynamic features gives a tiny but persistent accuracy gain. As FIG. 9 shows, this gain is implicitly confirmed by the higher Upper bounds for the same window sizes.

2. Technical collection: This collection is composed of technical documents, accounting for about 7,000 pages and 275,000 lines. The annotation task has been presented in Section 2 above. It targets labeling LINEs and PAGEs in the layout-oriented documents. The dynamic features which bind input elements in the target dependency graph have been presented in Section 2.1. In all tests, the precision, recall and F1 measures are employed, separately for each type and jointly for the entire set. Precision refers to the percentage of assigned class labels that are correctly identified. Recall refers to the fraction of all class labels identified. The F1 measure gives equal weight to precision and recall, F1=2 (Precision*Recall)/(Precision+Recall). As shown in FIG. 5, neighbor(LINE) returns two neighbor LINEs and a PAGE that the given line is a part of. Similarly, neighbor(PAGE) returns two neighbor PAGEs and all LINEs that the page includes.

When stacking models in the exemplary Stacking method are trained on the Technical collection, the stack size l can vary from 1 to 5. 5-fold validation is used for both internal and external cross-validations. Table 1 shows results for the Upper bound, the Basic method, and exemplary Stacking method. As the table shows, no significant difference between models with different stack sizes is observed. For each of the stack sizes, an improvement was found over the Basic method.

TABLE 1

|  | Precision | Recall | F1 |
| --- | --- | --- | --- |
| Upper | 94.867 | 91.002 | 92.894 |
| Stack size l = 5 | 83.996 | 75.381 | 79.456 |
| Stack size l = 4 | 83.785 | 74.604 | 78.928 |
| Stack size l = 3 | 83.996 | 75.381 | 79.456 |
| Stack size l = 2 | 83.984 | 74.874 | 79.168 |
| Stack size l = 1 | 84.102 | 74.731 | 79.140 |
| Basic | 77.383 | 69.869 | 73.435 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for annotating a document comprising:
for a plurality of different types of data element, modeling data elements of an input document and dependencies between the data elements as a dependency network, at least some of the data elements being associated with a label;
defining static features of at least some of the data elements, the static features each expressing a relationship between a characteristic of the data element and its label;
defining a set of dynamic features, each of the dynamic features defining a link between a label of a first data element in a pair of the data elements and a label of a second data element in the pair of data elements;
learning parameters of a collective probabilistic model for the document, the parameters expressing, for each of a plurality of the data elements, a conditional probability that the data element should be labeled with a neighbor label comprising information derived from a label of another data element linked to the data element by a dynamic feature, the learning including training a set of local learning models to generate estimations of the neighbor labels for at least one of the data elements based on static features and stacking the local learning models with higher level models to refine the estimations; and
collectively classifying data elements in the collective probabilistic model based on the learned parameters, whereby at least some of the data elements are each annotated with a label comprising information derived from the label of another element.

2. The method of claim 1, wherein the learning comprises:
refining the local learning models for pairs of the data elements that are linked by the dynamic features, through one or more levels of refinement, wherein at each subsequent refinement level, estimations of assigning labels from an additional set of neighbor elements linked by the dynamic features are derived.

3. The method of claim 2, wherein the additional set is selected based on an entropy-based interaction measure.

4. The method of claim 1, wherein the learning comprises employing a stacked approximation of the collection classification model to learn the parameters of the collective classification model.

5. The method of claim 4, wherein the stacked approximation includes:
learning the parameters of the collective probabilistic model in a first approximation; and
refining the learned parameters of the collective probabilistic model in a second approximation.

6. The method of claim 1, wherein the types of data element include types selected from the group consisting of PAGEs, PARAGRAPHs and LINEs.

7. The method of claim 6, wherein the set of dynamic features includes dynamic features which link selected data element types from the group consisting of PAGEs, PARAGRAPHs and LINEs.

8. The method of claim 1, further comprising, identifying at least two of the types of data element for which elements of that type are to be labeled by using dynamic features in the collective classification.

9. The method of claim 8, wherein for each type of data element for which the data elements of that type are to be classified, the method includes separately employing a stacked approximation.

10. The method of claim 1, wherein the collective classifying the data elements in the model includes collectively classifying elements of at least two of the different types, and wherein the collective classification is separately performed for each of the different types.

11. The method of claim 1, wherein the data elements are modeled as nodes in the relational dependency network, each node being linked to at least one other data element.

12. The method of claim 11, wherein the types of data include at least a first type of data associated with a first level of nodes and a second type of data associated with lower level nodes.

13. The method of claim 1, wherein at least some of the data elements include text.

14. The method of claim 1, wherein the static features include features selected from the group consisting of:
content features which express properties of text in a data element;

structural features which capture a context in the dependency network surrounding a data element;
attributes features which capture values of a data element's attributes in the dependency network; and
combinations thereof.

15. The method of claim 1, wherein the, wherein the characteristics include characteristics selected from the group consisting of:
font size;
font type;
location of the data element in the document;
and combinations thereof.

16. The method of claim 1, further comprising labeling links between pairs of data elements for which the collective classification annotates one data element in the pair with the dynamic feature corresponding to the label of the other data element.

17. The method of claim 1, wherein the classification permits a first data element to be annotated with a label comprising information derived from the label of a second data element which is neither a parent node nor a child node of the first data element in the dependency network.

18. The method of claim 1, further comprising, detecting distance relationships between data elements which are spaced by at least one intervening node in the dependency network, the collective classification including learning parameters of data elements that are in a distance relationship.

19. The method of claim 1, further comprising:
inputting, to a learning algorithm, a training set of input data that includes:
a) a set of typed input data elements with an associated set of static features; and
b) a set of typed element relationships between the input data elements;
returning at least one function for each of a plurality of levels, each function expressing a conditional dependency of the label of an element on the static features of the data element and an estimation of neighbor element labels; and
wherein the stacked approximation includes, for each of a plurality of refinement levels, each refinement level corresponding to a level in the learning algorithm:
applying the at least one function returned by the learning algorithm for the corresponding refinement level in an estimation of the probability that a first data element should be labeled with information derived from the label of a second data element linked to the first data element by a dynamic feature.

20. The method of claim 19, wherein for each refinement level, more distant links between data elements are considered in the parameter learning than in the prior level.

21. The method of claim 19, wherein a feature selection method is employed to identify a subset of the more distant links between data elements to be considered in the parameter learning.

22. A system for collectively classifying data elements of a document comprising:
a processor which, for a plurality of different types of data element, models data elements of an input document and relational dependencies between the data elements as a relational dependency network and labels data elements in the model with labels representing static features associated with the input document;
a probabilistic classifier which assigns conditional probabilities that data elements are to be labeled with a dynamic feature derived from a label of another data element, the classifier employing a stacked approximation to learn parameters of the data elements, each of the parameters expressing a conditional probability that a data element should be labeled with a label derived from a label of another data element linked to the data element by a dynamic feature.

23. The system of claim 22, wherein the classifier is a maximum entropy classifier.

24. A method for learning functions which are to be used in annotating a document comprising:
for a plurality of data elements in a training set of input data, the plurality of data elements being associated with a set of static features, each of the data elements being assigned to one of a plurality of data element types:
deriving a dependency network in which pairs of the data elements in the training set are linked by dynamic features selected from a set of dynamic features, each of the dynamic features defining a link between a label of a first data element in a pair of the data elements and a label of a second data element in the pair of data elements;
employing a learning algorithm to return at least one function for each of a plurality of levels, each function expressing a conditional dependency of the labeling of a data element with information from a neighbor data element upon static features of the element;
wherein at each level after the first level, links between more distant data elements are considered in returning the functions.

25. A document annotation method comprising:
training a static model level respective to static features of document elements, the trained static model level configured to assign labels to document elements;
assembling a stack of model levels having the static model level as the lowest level and further having one or more higher dynamic model levels generated by one or more iterations of a stacked generalization method comprising (i) constructing a set of dynamic features that link elements of a lower level of the stack and (ii) training a dynamic model level respective to the constructed set of dynamic features, the trained dynamic model level configured to assign labels to the document elements;
iteratively applying the stack of model levels to a document starting with the lowest static model level to infer a collective probabilistic model for the document expressing a joint conditional probability of labeling data elements with labels, each label being derived from a label of a neighbor data element linked to the data element by a dynamic feature in a relational dependency network; and
annotating the document based on the collective probabilistic model.

* * * * *